United States Patent [19]
Yabe et al.

[11] Patent Number: 6,082,209
[45] Date of Patent: *Jul. 4, 2000

[54] BALL SCREW

[75] Inventors: Takayuki Yabe; Nobuhide Kurachi, both of Gunma, Japan

[73] Assignee: NSK Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/941,305

[22] Filed: Sep. 30, 1997

[30] Foreign Application Priority Data

Sep. 30, 1996 [JP] Japan ................................. 8-259566

[51] Int. Cl.[7] ............................ F16H 25/22; F16H 25/24
[52] U.S. Cl. ............................ 74/459; 74/441; 74/89.15; 74/424.8 R
[58] Field of Search .................. 74/459, 89.15, 74/424.8 R, 441

[56] References Cited

U.S. PATENT DOCUMENTS

| | | | |
|---|---|---|---|
| 2,468,506 | 4/1949 | Millns | 74/459 |
| 2,714,821 | 8/1955 | Orner | 74/459 |
| 3,124,969 | 3/1964 | Grabowski et al. | 74/459 |
| 5,239,882 | 8/1993 | Druet | 74/424.8 R |
| 5,373,755 | 12/1994 | Rohlinger | 74/459 |
| 5,467,662 | 11/1995 | Lange et al. | 74/459 |
| 5,809,838 | 9/1998 | Miyaguchi et al. | 74/459 |

FOREIGN PATENT DOCUMENTS

| | | | |
|---|---|---|---|
| 416-449 | 3/1991 | European Pat. Off. | 74/459 |
| 4235842 A1 | 4/1994 | Germany | 74/459 |
| 58-113654 | 7/1983 | Japan | 74/459 |
| 3-181650 | 8/1991 | Japan | 74/459 |
| 535228 | 9/1993 | Japan . | |

*Primary Examiner*—Vinh T. Luong
*Assistant Examiner*—William C Joyce
*Attorney, Agent, or Firm*—Sughrue, Mion, Zinn, Macpeak & Seas, PLLC

[57] ABSTRACT

A ball screw includes a screw shaft 2 having an external ball-screw thread 2a, at least one ball nut 3 having an internal ball-screw thread which is opposite to the external ball-screw thread 2a of the screw shaft 2, a spiral raceway formed by combination of the internal ball-screw thread of the ball nut 3 and the external ball-screw thread 2a of the screw shaft 2, a plurality of balls which are circulated through the spiral raceway, and ball return paths 5, 6, and 7 for the plurality of balls. The ball screw also includes three or more circulation circuits X, Y, Z made by the spiral raceway and the ball return paths 5, 6, and 7 formed in the ball nut 3. Of the three or more three circulation circuits X, Y, Z, at least two circulation circuits are arranged so as to be in phase with each other in the circumferential direction of the ball screw 3, and the remaining circulation circuit is positioned so as to be 180 degree out of phase with the two circulation circuits in the circumferential direction. Accordingly it is possible to provide a compact ball screw having heavy load carrying capacity without increasing the size of the ball screw by averaging dispersions in the distribution of loads on the ball screw, and by reducing stress concentrated on the balls placed in a specific position.

12 Claims, 8 Drawing Sheets

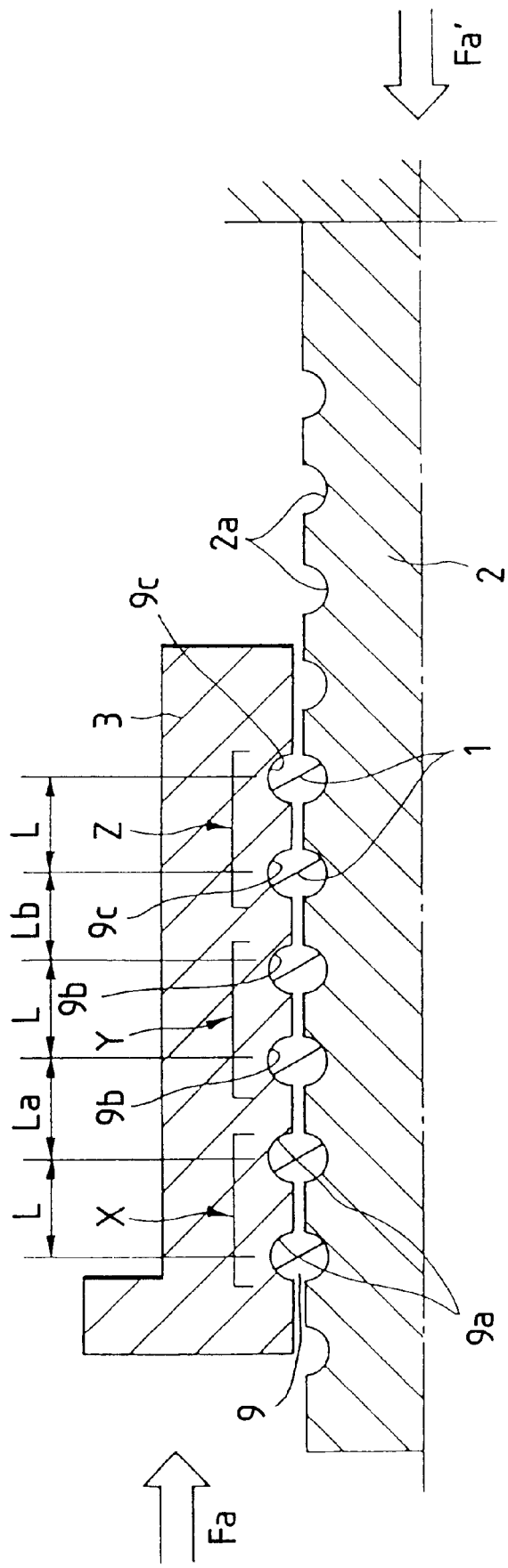

BALL SCREW

BACKGROUND OF THE INVENTION

The present invention relates to a ball screw which converts rotation into linear motion and, more particularly, to improvements in a ball screw used for heavy-load applications.

According to a conventional ball screw, the initial contact angle and the maximum contact angle of ball-screw threads to be formed on a screw shaft or a ball nut are respectively set to about 45 degree and about 65 degree in consideration of balanced workability, operability, and load-carrying capacity.

For example, in the case of a tube-circulated type ball screw as shown in FIG. 1, if a ball screw has ball circulation paths for a plurality of circuits, the attachment positions for the circulation tube 50 of each circulation paths are concentrated into one plane in order to reduce the number of machining processes. More specifically, a plurality of circulation tubes 50a, 50b, and 50c are usually designed so as to be axially arranged into a line and also arranged in the same phase with each other in the circumferential direction as shown in FIG. 1. Note that FIG. 1 shows the ball screw having three circulation circuits.

In a case where a ball screw is designed, a slightly large safety factor is set, so that a ball screw having a sufficient shaft diameter to satisfy working conditions is usually selected. At this time, if the shaft diameter of the ball screw cannot be increased, usually the number of circuits formed in a ball nut 51 or the number of balls is increased, or the lead of the thread of the ball screw is increased to thereby increase the diameter of a ball.

In the meanwhile, in the prior art, the selection of a suitable ball screw is made in consideration of load conditions on the basis of an assumption that load is uniformly exerted on all-balls rotating in the space between a screw shaft 52 and the ball nut 51. Namely, in the prior art, the suitable ball screw is selected by calculating a contact pressure on the basis of an averaged load which is obtained by dividing the load by the number of effective balls constrained to the ball nut 51, and comparing the thus-calculated contact pressure with a database concerning the function and life of the ball screw obtained as a result of tests.

In practice, however, the load is not uniformly exerted on all the so-called effective balls rotating in the space between the screw shaft 52 and the ball nut 51. Axial dispersion arise in the distribution of loads on the inside of the ball nut 51 owing to the elastic deformation of the screw shaft 52 and the ball nut 51 caused when they are subjected to the load. For example, similar to a case where heavy-weight material is machined on a work table supported by a ball screw, in a case where axial load Fa is exerted on the ball nut 51 of the ball screw and another axial load Fa' is exerted on the screw shaft 52 in the directions as shown in FIG. 2, the axial distribution of elastic displacements of the ball nut 51 and the screw shaft 52 in respective ball-screw threads 51a, 52a are represented by arrows shown in FIG. 2. It is understood that stress concentrates on the points of contact between the balls and the opposite ends of the ball nut 51 in accordance with the amount of elastic displacement of the screw shaft 52 and the ball nut 51.

The balls rotating in the respective circulation paths are sequentially scooped on and fed to a circulation tube 50 from the ball-screw threads 51a, 51b and are circulated. The balls are in contact with only the threads of the screw shaft 52 which are opposite to the ball nut 51. For this reason, dispersions also arise in the distribution of loads in the circumferential direction, thereby imposing heavy loads on a part of the effective balls. FIG. 3 shows the circulation of the balls of each circuit within the ball nut 51. As shown in FIG. 4, as a result of feeding the balls 1 to the circulation tube 50 from the ball-screw threads, the number of balls existing in the circumferential range of the ball nut 51 which has angle β is comparatively reduced when the ball nut 51 is viewed in the direction of the axis. Eventually, the load exerted on the balls existing in the range having angle β is comparatively increased.

As described above, as a result of the such concentrations of stress on the contact points between the balls and the opposite end portions of the ball nut 51 and the such increase in the load exerted on the balls which exist in the specific range of the ball circulation path, there are problems that the surface of the ball-screw threads 51a, 52a of the ball nut 51 and the screw shaft 52 is flaked at early time or abnormally abraded if the designed safety factor of the conventional ball screw is set on a small value.

For heavy load applications, if the safety factor is set to a large value, the size of the ball screw becomes large and fails to meet desired specifications or is costly.

SUMMARY OF THE INVENTION

The present invention has been contrived in terms of the foregoing problems in the prior art, and it is an object of the present invention to provide a compact ball screw which achieves large load carrying capacity without increasing the size of the ball screw by averaging dispersions in the distribution of loads on the ball screw, and by reducing the stress concentrated on the balls located in a specific position.

The aforementioned problems can be achieved by a ball screw, in accordance with the present invention, comprises:
  a screw shaft having an external ball-screw thread;
  a ball nut having an internal ball-screw thread which is opposite to the external ball-screw thread of the screw shaft so as to define a spiral raceway between the internal ball-screw thread and the external ball-screw thread;
  a plurality of balls which are circulated through the spiral raceway; and
  ball return paths formed on the ball nut and communicated with the spiral raceway so as to define endless ball circulation circuits for the plurality of balls;
  wherein the endless ball circulation circuits comprises three or more circulation circuits, each of which is made up of the spiral raceway and one of the ball return paths,
  at least two circulation circuits of the three or more circulation circuits are arranged so as to be in phase with each other in the circumferential direction of the ball screw, and
  the remaining circulation circuit is positioned so as to be 180 degree out of phase with the at least two circulation circuits in the circumferential direction.

In the above-mentioned construction, preferably, the number of circulation circuits is an even number, a half of the circulation circuits are arranged so as to be in phase with each other in the circumferential direction, and the remaining circulation circuits are arranged so as to become 180 degree out of phase with the half of the circulation circuits in the circumferential direction.

In addition, in the above-mentioned construction, preferably, the number of circulation circuits is an odd number (n), (n/2)+0.5 circulation circuits, where "n" is the number of circulation circuits, are arranged so as to be in phase with each other in the circumferential direction, and the other circulation circuits are arranged so as to become 180 degree out of phase with the odd numbered circulation circuits in the circumferential direction.

Further, in the above-mentioned construction, preferably, at least one circulation circuit of all the circulation circuits is offset from the other circulation circuits in the axial direction of the ball screw.

Furthermore, in the above-mentioned construction, preferably, the endless ball circulation circuits comprises a first, second and third ball circulation circuits arranged in order in the axial direction of the ball screw, the first and third circulation circuits of the endless ball circulation circuits are arranged so as to be in phase with each other in the circumferential direction of the ball screw, and the second circulation circuit is positioned so as to be 180 degree out of phase with the first and third circulation circuits in the circumferential direction.

Still further, in the above-mentioned construction, preferably, a plurality of balls circulated in at least one circulation circuit of all the circulation circuits is different in a diameter from that circulated in the other circulation circuits.

Still furthermore, in the above-mentioned construction, preferably, the endless ball circulation circuits comprises first, second and third circulation circuits arranged in order in the axial direction of the ball screw, and a plurality of balls circulated in the first and third circulation circuits are smaller in a diameter from than that circulated in the second circulation circuit.

With the above-mentioned construction according to the present invention, at least two circulation circuits of the three or more three circulation circuits are arranged so as to be in phase with each other in the circumferential direction of the ball screw, and the remaining circulation circuits are 180 degree out of phase with the at least two circulation circuits in the circumferential direction. As a result, the area of one circulation circuit in the circumferential direction which is in contact with a smaller number of balls (i.e., the area of the circulation circuit on which heavy loads are imposed, or a few-ball area) becomes 180 degree out of phase with the area of another circulation circuit in the circumferential direction which is in contact with a smaller number of balls (i.e., the area of the circulation circuit on which heavy loads are imposed, or a few-ball area). Accordingly, the few-ball areas (or no-ball areas) of the circulation circuits are dispersed and averaged in the circumferential direction, thereby resulting in a reduction in dispersions in the distribution of loads in the circumferential direction.

The area of each circulation circuit that is in contact with a smaller number of balls is in the range of an angle smaller than 180 degree. Accordingly, since the few-ball areas are 180 degree out of phase with each other, the few-ball areas of at least two circulation circuits are prevented from overlapping with the few-ball areas of the other circulation circuits in the circumferential direction.

To eliminate dispersions in the axial load, at least one circulation circuit of all the circulation circuits comprising three or more circulation circuits is offset from the other circulation circuits in the axial direction of the ball screw. As described above, as a result of one circulation circuit being offset, a pre-load is imparted to the balls on the ball nut side of the offset ball-screw threads. In comparison with the amount of elastic displacement of the ball-screw thread in a case where the circulation circuit is not offset, the amount of elastic displacement obtained in the present case is increased. Further, the load exerted on the balls held in the offset circulation circuit is increased, and the loads exerted on the balls (in the vicinity of the opposite end portions of the ball nut where stress concentrates on the balls while the circulation circuit is not offset) are decreased.

BRIEF DESCRIPTION OF THE DRAWINGS

FIG. 6 is a schematic representation showing the structure of the ball screw in accordance with the embodiment;

DETAILED DESCRIPTION OF THE PREFERRED EMBODIMENTS

With reference to the drawings, an embodiment of the present invention will be described.

Figure 5A:
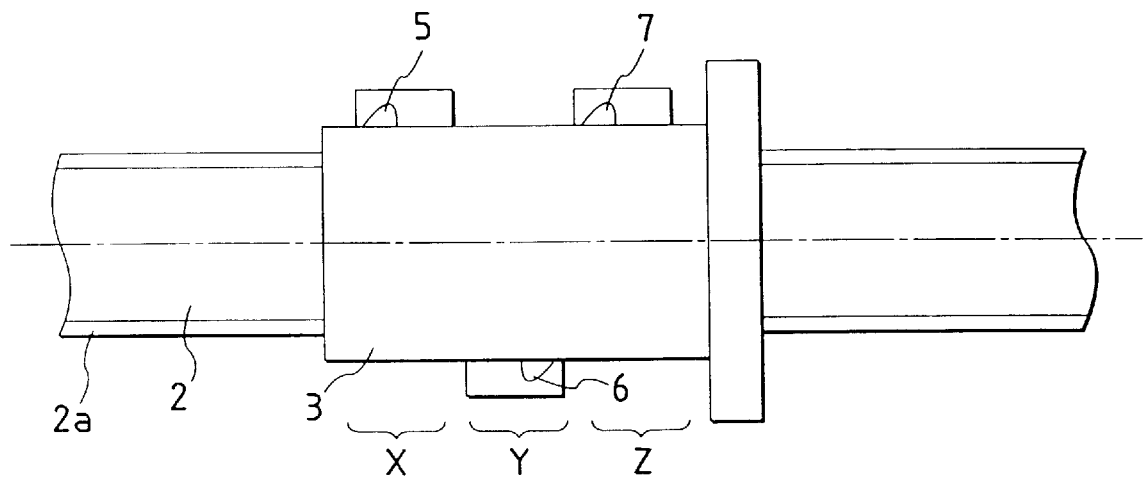
FIG. 5(a) is a fragmentary side view showing a ball screw in accordance with an embodiment of the present invention.

First, the structure of a ball screw according to the present invention will be described. As shown in FIG. 5(a), a ball nut 3 is threadedly engaged with the outer surface of a screw shaft 2 via a plurality of balls. When either the screw shaft 2 or the ball nut 3 is rotated with reference to the other one, the ball nut 3 linearly travels along the screw shaft 2.

As shown in FIG. 6 which is a schematic representation of the ball screw, a female ball-screw thread 2a is formed on the external surface of the screw shaft 2, and a female ball-screw thread 9 is formed on the internal surface of the ball nut 3 so as to be opposite to the ball-screw thread 2a of the screw shaft 2 in the radial direction of the ball nut 3. A plurality of balls 1 (hatched in FIG. 6) are sandwiched between the ball-screw threads 2a and 9 and are rotated and circulated along the ball-screw thread 2a.

The ball screw in accordance with the present embodiment is a tube ball screw having three endless ball circulation paths.

More specifically, as shown in FIG. 6, the ball-screw thread 9 of the ball nut 3 is divided into three sub-divisions 9a, 9b, and 9c in the axial direction. Both ends of the sub-divisions of the ball-screw thread 9 are connected to respective circulation tubes 5, 6, and 7 which form ball return paths, whereby three ball circulation paths are formed. For convenience in explanation, the circulation paths are respectively referred to as a first circuit X, a second circuit Y, and a third circuit Z from the left in FIGS. 5(a) and 6.

In the present embodiment, as shown in FIG. 5(a), the attached positions of the circulation tubes 5, 7 of the first circuit X and the third circuit Z are 180 degree out of phase with the attached position of the circulation tube 6 of the second circuit Y in the circumferential direction.

As shown in FIG. 6, the circulation paths of the second circuit Y are axially offset so as to become close to the third circuit Z by tens of micrometers. More specifically, a lead La between the ball-screw thread 9a of the first circuit X and the ball-screw thread 9b of the second circuit Y is increased so as to become larger than a lead L between the ball-screw threads 9a, between the ball-screw threads 9b, and between the ball-screw threads 9c by tens of micrometers (a) (i.e., the lead is set so as to satisfy La=L+$\alpha$). Further, a lead Lb between the ball-screw thread 9b of the second circuit Y and the ball-screw thread 9c of the third circuit Z is set so as to become smaller than the lead L by tens of micrometers ($\alpha$) (i.e., the lead is set so as to satisfy Lb=L−$\alpha$). In contrast, as a matter of course, the lead between the ball-screw threads 2a of the screw shaft 2 is uniform.

Figure 7:
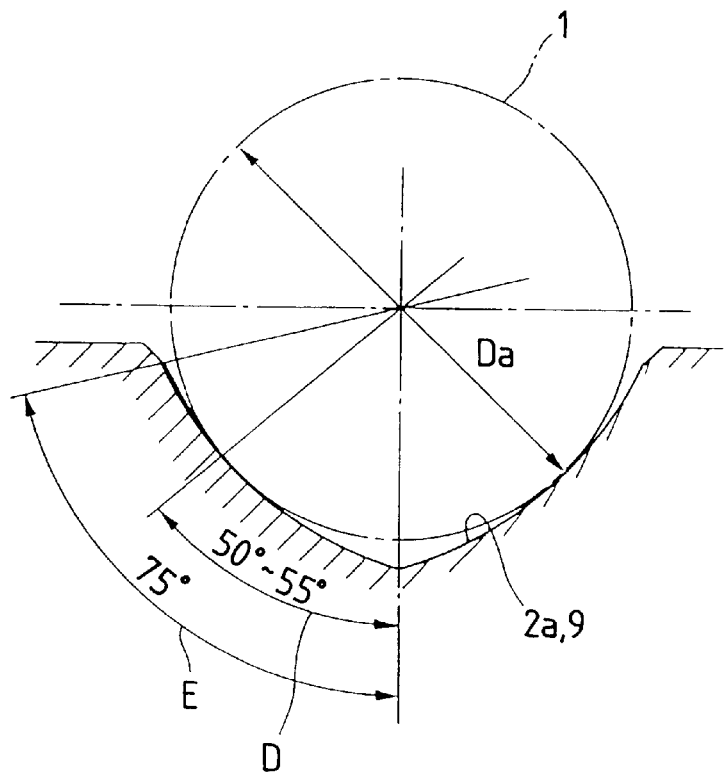
FIG. 7 is a cross-sectional view showing the profile of a ball-screw thread of the ball screw in accordance with the embodiment.
Figure 8:
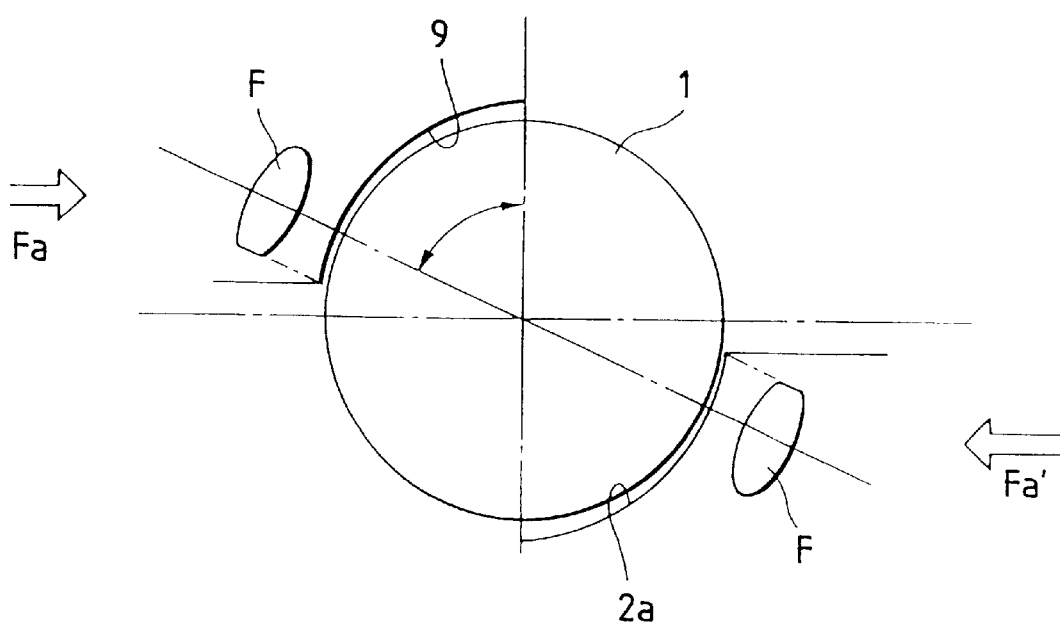
FIG. 8 is a diagrammatic representation showing the relationship between a contact angle and contact ellipses.

In order to increase the load carrying capacity of the ball screw, it is desirable to increase the contact angle of the ball 1 and the curvature radius of the ball-screw threads 2a, 9 to the largest values possible. However, as shown in FIG. 8, if an axial load is exerted on the ball while the contact angle is excessively increased, the edges of contact ellipses F extend off the edges of the ball-screw threads 2a, 9 and are eventually cut. If part of the contact ellipses F are cut, the load exerted on the ball becomes increased, thereby considerably shortening the life of the ball screw. For this reason, as shown in FIG. 7, an initial contact angle D is set to 50 degree to 55 degree, and the maximum contact angle E is set to 75 degree in the present embodiment.

Each of the balls 1 used in the present embodiment has a diameter Da which forms the following relationship with respect to the lead L of the ball-screw thread 9.

$$0.7 \leq (Da/L)$$

In the present embodiment, Da/L can be set to a value of 0.7 or more by making the angle in the axial direction, at which the ball 1 is scooped and fed from the ball-screw thread to the tube, larger as compared with the angle of the conventional ball screw.

In this connection, note that if Da/L of the conventional ball screw is set to a value of 0.7 or more, a risk arises of the outer diameter of the circulation tube interfering with the ball-screw thread. For this reason, Da/L was limited to set a value at 0.7 or less in the prior art.

The operation of the ball screw having the foregoing structure and advantageous results resulting from the operation will now be described.

As a result of the second circuit Y being offset toward the third circuit Z, a pre-load is imparted to the balls located in the ball-screw thread 9b of the second circuit Y. The amount of the elastic displacement of the ball-screw thread 9b caused when the axial load Fa is exerted on the ball nut 3 becomes larger than that obtained in a case where the second circuit Y is not offset, thereby resulting in an increase in the contact area between the ball and the ball-screw thread. The load exerted on the balls located in the offset second circuit Y is increased, and the loads exerted on the balls located in the first and third circuits X and Z (in the vicinity of the opposite ends of the ball nut 3 where stress concentrates on the balls while the second circuit is not offset) are reduced. Accordingly, the distribution of axial loads on the ball nut 3 is averaged, so that dispersions in the distribution of axial loads is reduced.

Further, the attached positions of the circulation tubes 5, 7 of the first circuit X and the third circuit Z are 180 degree out of phase with the attached position of the circulation tube 6 of the second circuit Y in the circumferential direction. As a result, the areas of the first and third circuits X and Z in the circumferential direction which are in contact with a smaller number of effective balls are prevented from overlapping with the area of the second circuit Y in the circumferential direction which is in contact with a smaller number of effective balls. In short, load-free areas of the circuits (which are not in contact with the balls 1) are dispersed in the circular direction, thereby reducing dispersions in the distribution of loads on the effective balls 1 in the circumferential direction.

As described above, the distribution of axial and circumferential loads on the effective balls (the balls 1 which rotate in the space between the screw shaft 2 and the ball nut 3) becomes more uniform in comparison with that in the conventional ball screw. The distribution of loads on each of the effective balls 1 and the distribution of loads on the ball-screw threads 2a, 9 of the screw shaft 2 and the ball nut 3 which are in contact with the balls 1 are averaged to thereby increase the load carrying capacity of the ball screw.

In the present embodiment, the initial contact angle D and the maximum contact angle E of the ball 1 are set to values which are larger than those in the conventional ball screw, and Da/L can be set to a value of 0.7 or more, thereby resulting in a further increase in the load carrying capacity.

Although only the attached position of the circulation tube 6 of the second circuit Y is set so as to become 180 degree out of phase with the attached position of the circulation tube 5 of the first circuit X in the previous embodiment, the attached position of the circulation tube 7 of the third circuit Z may be set so as to become 180 degree out of phase with the attached position of the circulation tube 5 of the first circuit X. Further, the attached positions of the circulation tubes 5, 6 of the first and second circuits X and Y may be set so as to become 180 degree out of phase with the attached position of the circulation tube 7 of the third circuit Z in the circumferential direction.

The present embodiment has been described with reference to an example in which the ball-screw threads 9b of the circulation paths of the second circuit Y are offset toward the third circuit Z in a case where the axial load Fa exerted on the ball nut 3 is imposed on the first circuit X. In contrast, in a case where the axial load exerted on the ball nut 3 is imposed on the third circuit Z, the ball-screw threads 9b of the circulation paths of the second circuit Y are offset toward the first circuit X.

In the present invention, dispersions in the amount of elastic displacement of the ball nut 3 in the axial direction are averaged by offsetting a part of the plurality of circulation paths in the axial direction to thereby average the distribution of axial loads on the balls. As a result, the present invention yields the advantage of increasing the overall load carrying capacity of the ball screw.

This advantage may be obtained by changing the size of balls fitted into a part of the circulation paths, e.g., by increasing the diameter of the balls 1 used in the second circuit Y so as to become relatively larger than that of the balls 1 used in the first and third circuits X and Z in the previous embodiment. Specifically, and with reference to FIG. 7, the balls 1 circulating through the second circuit Y have a diameter Da' which is greater that the diameter Da of the balls 1 circulating through the first circuit X and the third circuit Z. As a result of an increase in the diameter of the balls 1 used in the second circuit Y, a pre-load is imparted to the balls located in the ball-screw thread 9b of the second circuit Y. The amount of the elastic displacement of the ball-screw thread 9b caused when the axial load Fa is exerted on the ball nut 3 becomes larger than that obtained in a case where the diameter of the balls used the second circuit Y is not increased, thereby resulting in an increase in the contact area between the ball and the ball-screw thread. The load exerted on the balls located in the second circuit Y is increased, and the loads exerted on the balls located in the first and third circuits X and Z in the vicinity of the opposite ends of the ball nut 3 where stress concentrates on the balls are reduced. Accordingly, the distribution of axial loads on the ball nut 3 is averaged, so that dispersions in the distribution of axial loads is reduced. Consequently, the axial load exerted on the balls 1 placed in the second circuit Y is increased in comparison with that in the conventional ball screw, whereby the ball screw operates in an analogous manner and yields similar advantageous results.

As a matter of course, the ball-screw thread 9 of the second circuit Y may be offset toward the first circuit X or the third circuit Z, and the diameter of the balls 1 placed in the second circuit Y may be set so as to become larger than that of the balls 1 placed in the first and third circuits X and Z.

Although, as previously described, the circulation paths are positioned so as to become 180 degree out of phase with the other circulation paths and are offset in the previous embodiment, dispersions in the distribution of loads are reduced by only positioning the circulation paths so as to become 180 degree out of phase with the other circulation paths, thereby resulting in an increase in the load carrying capacity of the ball screw in comparison with that of the conventional ball screw.

EXAMPLE

Figure 9:
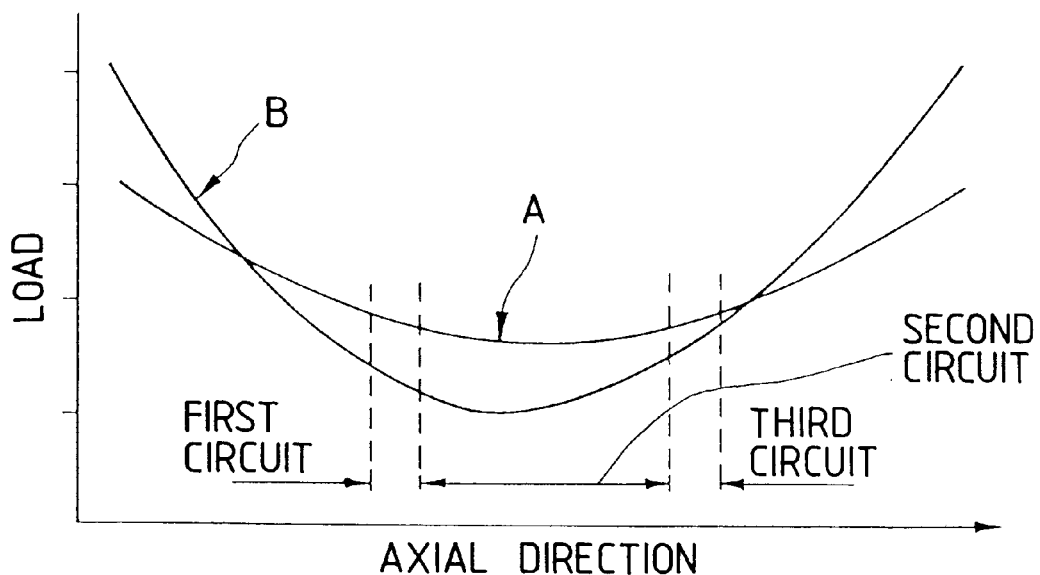
FIG. 9 is a plot showing the offset effect of circulation paths according to the present invention in the form of a comparison between the distributions of axial loads without taking into consideration dispersions in the distribution of circumferential loads.
Figure 10:
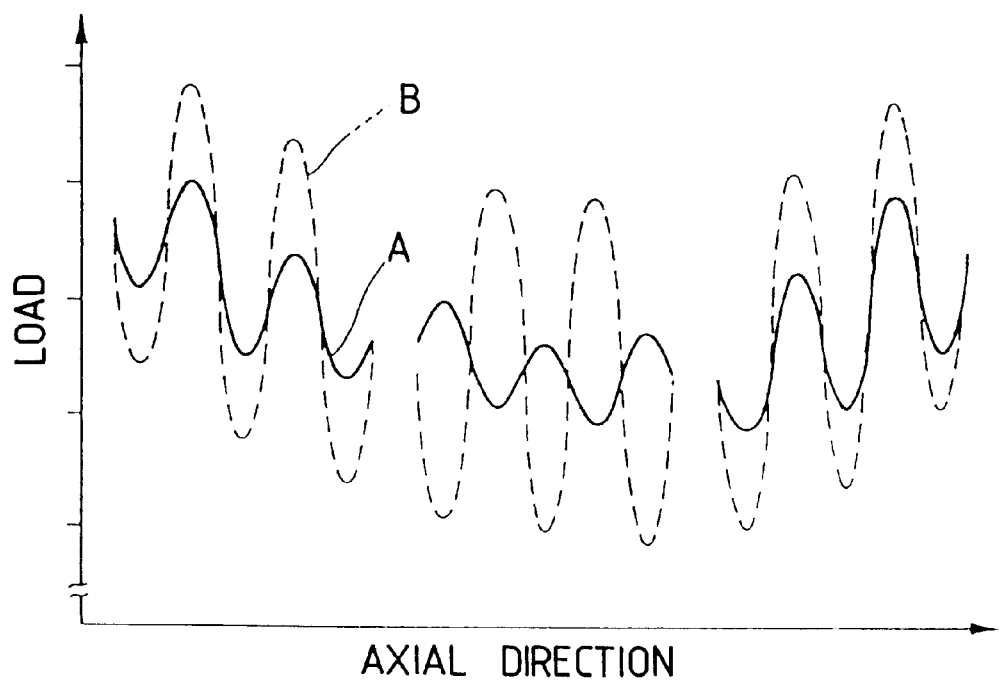
FIG. 10 is a plot showing the inverting effect of circulation paths according to the present invention in the form of a comparison between the distributions of axial loads in consideration of dispersions in the distribution of axial loads and dispersions in the distribution of circumferential loads.

Results such as those shown in FIGS. 9 and 10 are obtained as a result of analysis of the distribution of loads by comparing the ball screw according to the present invention with a ball screw (a comparative example) which complies with the conventional specifications, namely, has three circulation tubes 5, 6, 7 positioned in phase with each other in the circumferential direction and the circulation paths of all the three circuits X, Y, Z spaced at uniform intervals in the axial direction.

FIG. 9 shows the distribution of axial loads exerted on the effective balls 1 in consideration of only dispersions in the distribution of axial loads without taking into consideration dispersions in the distribution of circumferential loads. In the drawing, reference symbol A designates the distribution of loads on the ball screw according to the present invention, and reference symbol B designates the distribution of loads on the ball screw of the comparative example.

As can be seen from FIG. 9, in the case of the ball screw according to the present invention, the load exerted on the second circuit Y is increased, and the loads exerted on the first and third circuits X and Z are reduced, thereby resulting in the distribution of axial loads being averaged.

FIG. 10 shows the axial load exerted on each of the effective balls 1 in the direction of the ball-screw thread 9 in consideration of the distribution of circumferential loads and dispersions in the distribution of axial loads. In the drawing, reference symbol A (indicated by a solid line) designates the axial load exerted on the ball in the ball screw according to the present invention, and reference symbol B (indicated by a broken line) designates the axial load exerted on the ball in the ball screw of the comparative example.

As can be seen from FIG. 9, the amplitude of the load in the direction of the ball-screw thread 9 of the ball screw according to the present invention becomes smaller than that of the comparative example, and hence the distribution of circumferential loads is averaged.

In practice, it is acknowledged that the load carrying capacity of the ball screw A according to the present invention is increased by about 20% without changing the outer diameter of the ball screw in comparison with that of the ball screw B of the comparative example.

Figure 5B:
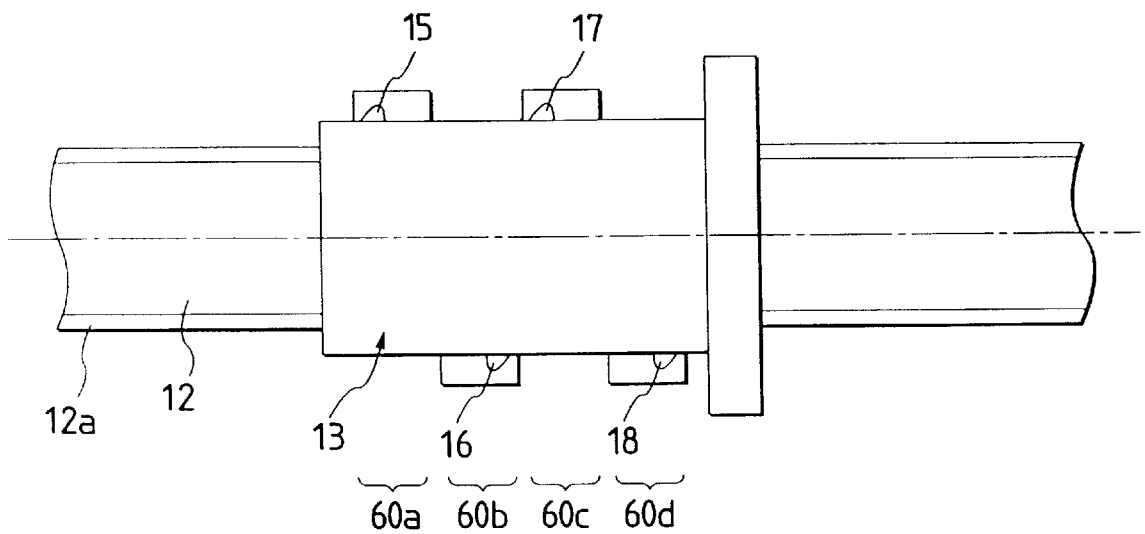
FIG. 5(b) is a fragmentary side view showing a ball screw in accordance with a modification of the embodiment of the present invention.

Further, although as an embodiment of the present invention, the ball screw provided with an odd number (i.e. three) of ball circulation circuits as shown in FIG. 5(a) is explained, the present invention is also applicable into a ball screw provided with an even number of ball circulation circuits shown in FIG. 5(b), unless it satisfies a following condition that: a half of the circulation circuits are arranged so as to be in phase with each other in the circumferential direction; and the remaining circulation circuits are arranged so as to become 180 degree out of phase with the half of the circulation circuits in the circumferential direction.

As shown in FIG. 5(b), the ball circuit is provided with four ball circulation circuits (60a, 60b, 60c, 60c) containing circulation tubes 15, 16, 17 and 18 which form respective ball return paths with the screw thread 12a of the screw shaft 12. Two of the four ball circulation circuits (60a, 60c) are arranged so as to be in phase with each other in the circumferential direction, and the remaining two circulation circuits (60b, 60d) are arranged so as to be 180 degree out of phase with the two circulation circuits (60a, 60c) in the circumferential direction. The other remaining components of the ball screw shown in FIG. 5(b) is the same in construction and function as that shown in FIG. 5(a), so explanation thereof is eliminated.

Figure 1:
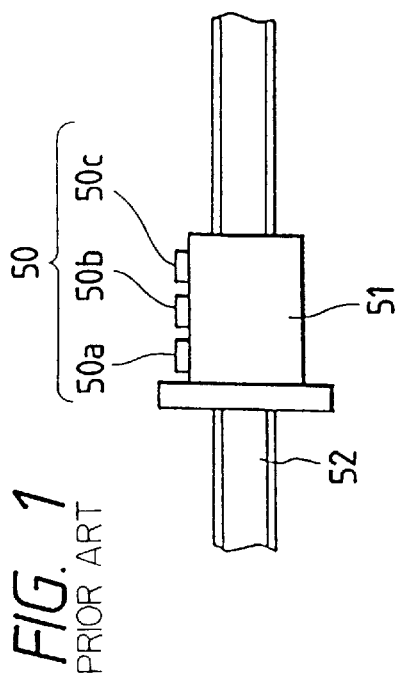
FIG. 1 is a fragmentary side view showing an conventional ball screw.
Figure 2:
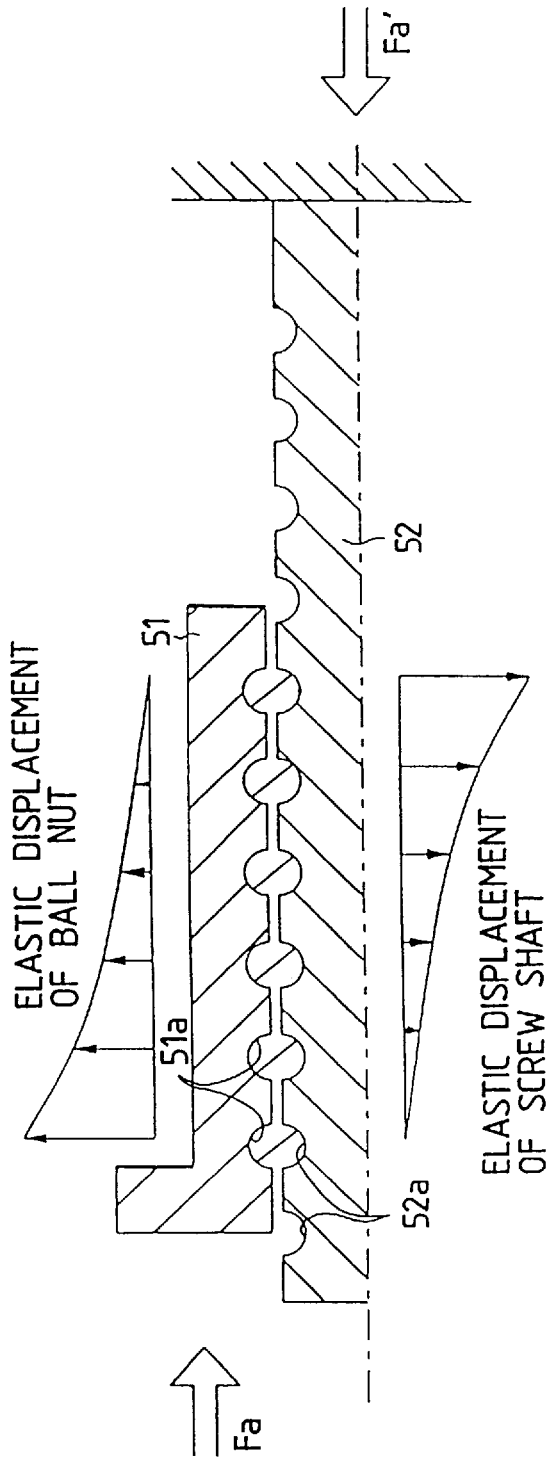
FIG. 2 is a schematic representation showing the amount of elastic displacement which causes dispersions in an axial load.
Figure 3:
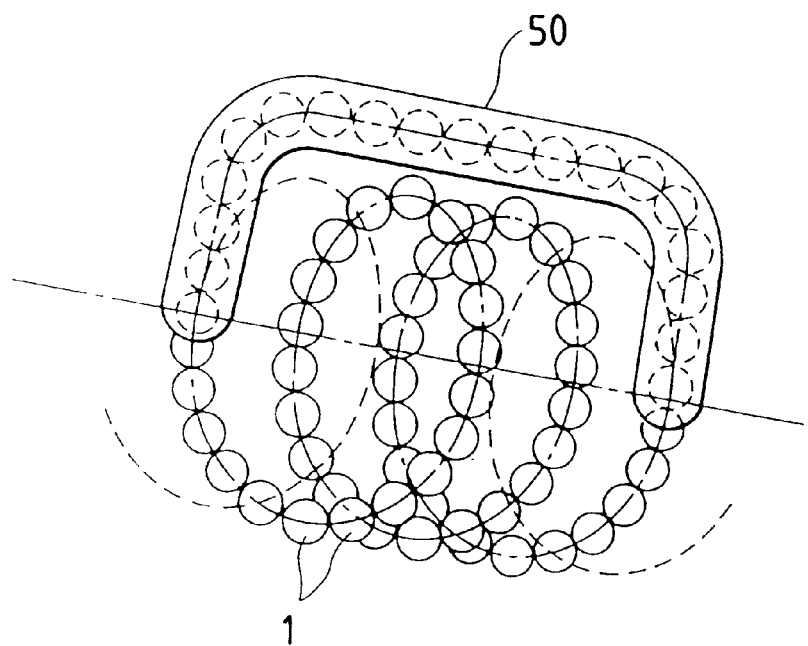
FIG. 3 is a schematic representation showing the circulation of balls along one circulation path.
Figure 4:
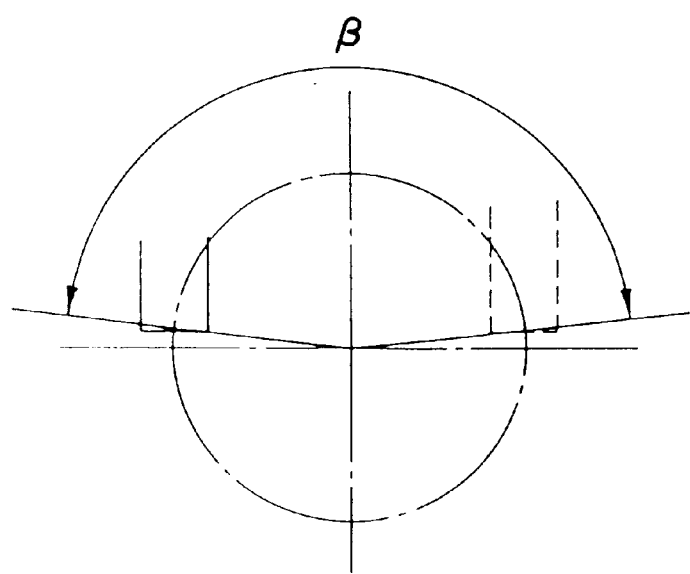
FIG. 4 is a view showing the circumferential extent of the ball screw which is not in contact with any balls when the ball screw is viewed in the direction of the axis of the ball screw.

The ball screw according to the present invention is not limited to apply into a tube circulation ball screw such as that described in the embodiment. For example, the present invention can also be applied to a so-called deflector circulation ball screw such as that shown in FIGS. 1 and 2 of Japanese Patent Examined Publication No. Hei-5-35228. (The deflector circulation ball screw is provided with a ball return channel which connects together a plurality of sets of ball communication paths. A circulation path is formed from a guide plate attached to the outer periphery of a ball nut and from a ball scooping member which is provided inside each of the ball communication paths and sequentially guides to the ball communication path a group of balls sandwiched between a ball screw and a screw thread of the ball nut.).

Further, the present invention can be applied to a guide plate circulation ball screw such as that shown in FIG. 15 of the publication No. Hei. 5-35228 as an conventional ball screw (The ball screw has a ball return channel which connects together ball communication paths. A guide piece to be fitted into the ball communication paths is provided so as to protrude from a guide plate to be attached to the outer periphery of a ball nut. An external ball guide surface is formed on the inner side of the guide piece so as to substantially change the direction of balls between opposite ends of the ball return channel and each ball communication path thereon.).

Although the ball screw has been described with reference to a case where the circulation paths are divided into three circuits, namely, the first circuit X, the second circuit Y, the third circuit Z in the previous embodiment, the number of circulation circuits of the ball screw according to the present invention is not limited to three. The present invention can also be applied to a ball screw having three or more circulation circuits. Further, the present invention is not limited to a ball screw, in which three or more circulation circuits are formed in one ball nut. The present invention may also be applied to a ball screw which has two or more ball nuts, as in a double-nut ball screw which will be described later, and a total of three or more circulation circuits for all the ball nuts together.

Figure 11:
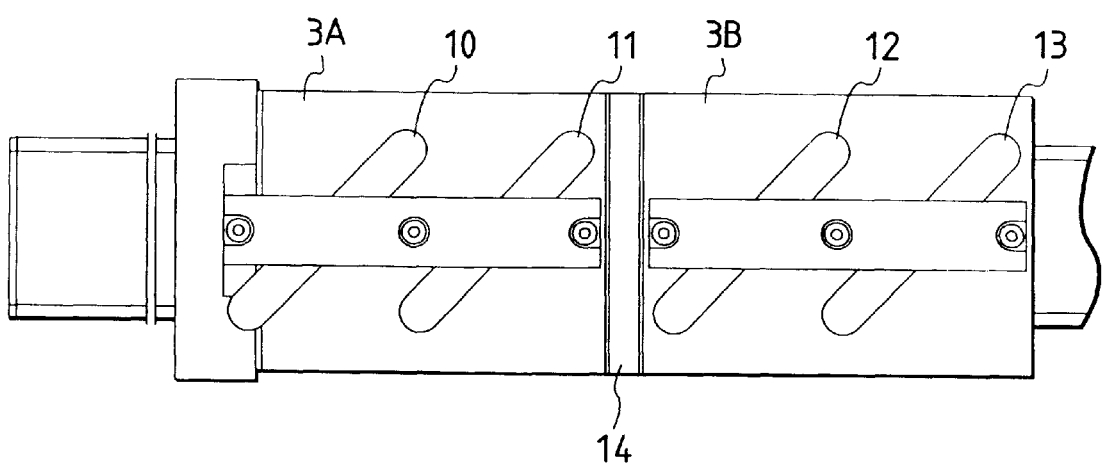
FIG. 11 is a longitudinal cross-sectional view showing a double-nut ball screw to which the ball screw according to the present invention is applied.
Figure 12:
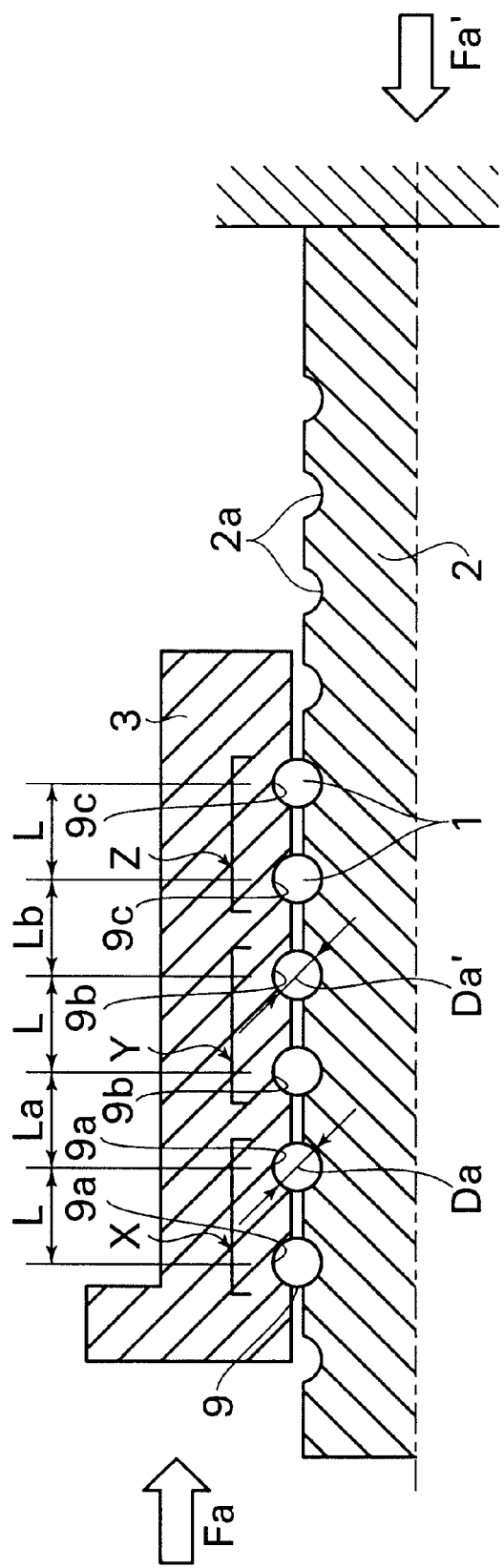
FIG. 12 is a schematic representation showing the structure of a ball screw in which the balls circulating through the second circuit have a greater diameter than the balls circulating through the first and third circuits.

Although a so-called single-nut ball screw having one ball nut has been described in the previous embodiment, the present invention can also be applied to a so-called double-nut ball screw, such as a ball screw which is shown in FIG. 11 and has two ball nuts 3A, 3B, or to a ball nut having two or more ball nuts. In the case of a multi-nut ball screw, for example, in the case of a double-nut ball screw shown in FIG. 11, one ball nut (e.g., 3A) of the two ball nuts 3A, 3B may be positioned so as to be 180 degree out of phase with the other ball nut. Alternatively, one (e.g., a circuit 10) of a pair of circuits (10, 11) of the ball nut 3A and one (e.g., a circuit 12) of a pair of circuits (12, 13) of the ball nut 3B may be positioned so as to be 180 degree out of phase with the other circuits (e.g., 11, 13). A spacer 14 may be interposed between the two ball nuts 3A, 3B so as to offset the circuits of the ball nuts (e.g., the pair of circuits 10, 11 and the pair of circuits 12, 13) instead of offsetting a circuit of one ball nut.

As has been described above, if the ball screw according to the present invention is employed, the distribution of loads which are exerted on a plurality of balls rotating in the space between a screw shaft and a ball nut is averaged; namely, the load concentrated on a part of the balls becomes small. Accordingly, the present invention has the advantage of increasing the load carrying capacity of the ball screw in comparison with that of an conventional ball screw without increasing the outer diameter of the ball screw.

More specifically, the present invention has the advantage of increasing the load carrying capacity of the ball screw without increasing its size to thereby extend the range of available heavy-load applications (e.g., an injection molding machine, molding processes, a power cylinder).

What is claimed is:

1. A ball screw including:
    a screw shaft having an external ball-screw thread;
    a ball nut having an internal ball-screw thread which is opposite to said external ball-screw thread of said screw shaft so as to define a spiral raceway between said internal ball-screw thread and said external ball-screw thread;
    a plurality of balls which are circulated through said spiral raceway; and
    ball return paths formed on said ball nut and communicated with said spiral raceway to define endless ball circulation circuits for said plurality of balls;
    wherein said endless ball circulation circuits comprise at least three circulation circuits, each of which (1) is made up of said spiral raceway and one of said ball return paths, and (2) is included in one of a first ball circulation circuit group and a second ball circulation circuit group, said first ball circulation circuit group including at least two circulation circuits of said at least three circulation circuits,
    said circulation circuits of said first ball circulation circuit group are positioned in phase with respect to each other in the circumferential direction of said ball screw,
    said circulation circuits of said second ball circulation circuit group are positioned 180 degrees out of phase with respect to said circulation circuits of said first ball circulation circuit group in the circumferential direction,
    all of said endless ball circulation circuits of said ball screw are included in one of said first and said second ball circulation circuit groups, and
    each of said endless ball circulation circuits has an external ball return tube mounted on said ball nut.

2. The ball screw according to claim 1, in which the total number of circulation circuits is an even number, and one half of the even number of said circulation circuits are included in said first ball circulation circuit group, and
    another half of the even number of said circulation circuits are included in said second ball circulation circuit group.

3. The ball screw according to claim 1, in which the number of circulation circuits is an odd number,
    (n/2)+0.5 circulation circuits, where "n" is the number of circulation circuits, are included in said first ball circulation circuit group, and
    n−((n/2)+0.05) circulation circuits are included in said second ball circulation circuit group.

4. The ball screw according to claim 3, in which said endless ball circulation circuits comprise a first circulation circuit, a second circulation circuit, and a third circulation circuit consecutively arranged in an axial direction of said ball screw,
    said first and said third circulation circuits are included in said first ball circulation circuit group, and
    said second circulation circuit is included in said second ball circulation circuit group.

5. The ball screw according to claim 1, in which said plurality of balls circulated in at least one circulation circuit is different in diameter with respect to the balls circulated in the other circulation circuits.

6. The ball screw according to claim 5, in which said endless ball circulation circuits comprise a first circulation circuit, a second circulation circuit and a third circulation circuit consecutively arranged in an axial direction of said ball screw,
    said plurality of balls circulated in said first and said third circulation circuits are smaller in diameter with respect to the balls circulated in said second circulation circuit.

7. The ball screw according to claim 6, wherein a lead of said internal ball-screw thread between said first and said second circulation circuits is greater than a lead of said internal ball-screw thread within each of said first, said second, and said third circulation circuits, and a lead of said internal ball-screw thread between said second and said third circulation circuits is less than a lead of said internal ball-screw thread within each of said first, said second, and said third circulation circuits such that said second circulation circuit is offset from said first and said third circulation circuits in the axial direction of said ball screw.

8. The ball screw according to claim 4, wherein said first circulation circuit and said third circulation circuit are different in a lead size from said second circulation circuit.

9. The ball screw according to claim 4, wherein (1) a first lead between said internal ball-screw thread of said first circulation circuit and said internal ball-screw thread of said second circulation circuit is larger than a second lead between said external ball-screw thread of said screw shaft, and (2) a third lead between said internal ball-screw thread of said second circulation circuit and said internal ball-screw thread of said third circulation circuit is smaller than said second lead.

10. The ball screw according to claim wherein a diameter of each ball and said second lead satisfies a relationship of $0.7 \leq (Da/L)$, where Da denotes the diameter of the ball and L designates the second lead.

11. A ball screw including:

a screw shaft having an external ball-screw thread;

a ball nut having an internal ball-screw thread which is opposite to said external ball-screw thread of said screw shaft so as to define a spiral raceway between said internal ball-screw thread and said external ball-screw thread;

a plurality of balls which are circulated through said spiral raceway; and ball return paths formed on said ball nut and communicated with said spiral raceway to define endless ball circulation circuits for said plurality of balls;

wherein said endless ball circulation circuits comprise at least three consecutively arranged circulation circuits, each of which (1) is made up of said spiral raceway and one of said ball return paths, and (2) is included in one of a first ball circulation circuit group and a second ball circulation circuit group, said first ball circulation circuit group including at least two circulation circuits of said at least three circulation circuits, said circulation circuits of said first ball circulation circuit group are positioned in phase with respect to each other in the circumferential direction of said ball screw, said circulation circuits of said second ball circulation circuit group are positioned 180 degrees out of phase with respect to said circulation circuits of said first ball circulation circuit group in the circumferential direction, a lead of said internal ball-screw thread between one circulation circuit and a consecutive circulation circuit is greater than a lead of said internal ball-screw thread within each of said at least three circulation circuits, and a lead of said internal ball-screw thread between said one circulation circuit and another consecutive circulation circuit is less than a lead of said internal ball-screw thread within each of said at least three circulation circuits, such that said one circulation circuit is offset from the other circulation circuits in the axial direction of said ball screw, all of said endless ball circulation circuits of said ball screw are included in one of said first and said second ball circulation circuit groups, and each of said endless ball circulation circuits has an external ball return tube mounted on said ball nut.

12. The ball screw according to claim 11, in which said endless ball circulation circuits comprise a first circulation circuit, a second circulation circuit and a third circulation circuit consecutively arranged in an axial direction of said ball screw, said first and said third circulation circuits are included in said first ball circulation circuit group, and said second circulation circuit is included in said second ball circulation circuit group.

* * * * *